United States Patent
Munro et al.

(10) Patent No.: US 7,871,046 B2
(45) Date of Patent: Jan. 18, 2011

(54) PALLET SUPPORT

(75) Inventors: David Munro, Knoxfield (AU); Sidney Patten, Belgrave (AU)

(73) Assignee: Amiata Holdings Pty Ltd., Knoxfield (AU)

( * ) Notice: Subject to any disclaimer, the term of this patent is extended or adjusted under 35 U.S.C. 154(b) by 0 days.

(21) Appl. No.: 12/356,900

(22) Filed: Jan. 21, 2009

(65) Prior Publication Data
US 2009/0183654 A1 Jul. 23, 2009

(30) Foreign Application Priority Data
Jan. 17, 2008 (AU) ............................ 2008900230

(51) Int. Cl.
*A47K 1/04* (2006.01)
(52) U.S. Cl. ................. 248/129; 248/346.02; 108/53.3; 280/79.11
(58) Field of Classification Search ............ 248/346.02, 248/429, 129, 430, 346.07, 346.06, 346.3, 248/298.1; 108/50.11, 51.11, 57.15, 54.1, 108/93, 57.17, 53.1, 53.3; 280/79.11, 79.3, 280/35, 638; 312/196, 249.9, 301
See application file for complete search history.

(56) References Cited

U.S. PATENT DOCUMENTS

| 1,166,241 | A | * | 12/1915 | Moore | 248/129 |
|---|---|---|---|---|---|
| 1,668,379 | A | * | 5/1928 | Radvanyi | 280/32.6 |
| 1,807,937 | A | * | 6/1931 | Selander | 108/63 |
| 2,614,017 | A | * | 10/1952 | Mugnier | 312/196 |
| 3,208,768 | A | * | 9/1965 | Hulbert | 280/408 |
| 6,257,152 | B1 | * | 7/2001 | Liu | 108/53.3 |
| 7,610,864 | B2 | * | 11/2009 | LaMarche et al. | 108/93 |

* cited by examiner

*Primary Examiner*—Gwendolyn Baxter
(74) *Attorney, Agent, or Firm*—Stites & Harbison PLLC; Douglas E. Jackson

(57) ABSTRACT

A pallet support comprising a support platform secured to a base frame via an intermediate frame, the intermediate frame being longitudinally slidable relative to the base frame and support platform, the support platform having ground engaging wheels whereby the support platform can be rolled off the base frame to pull the intermediate frame to one end of the base frame.

4 Claims, 3 Drawing Sheets

PALLET SUPPORT

This invention relates to supports for use with pallets.

In warehouses, pallets are often used to store a wide variety of produce. The pallets are transported through use of forklifts and hand-pulled trolleys. Palleted produce is stored in racks and it is usual for forklifts to deposit the pallets on the racks. The positioning of palleted produce in racks does not provide ready access to the produce and it is thus necessary to pull the pallet out of the rack to obtain access to the produce.

It is these issues which have brought about the present invention.

According to the present invention there is provided a pallet support comprising a support platform secured to a base frame via an intermediate frame, the intermediate frame being longitudinally slidable relative to the base frame and support platform, the support platform having ground engaging wheels whereby the support platform can be rolled off the base frame to pull the intermediate frame to one end of the base frame An embodiment of the present invention will now be described by way of example only with reference to the accompanying drawings in which.

The pallet support 10 shown in the accompanying drawings is fabricated from steel and essentially comprises a base frame 20 that supports an intermediate frame 30 which in turn supports a support platform 40 on which a pallet may be placed. The support platform 40 and intermediate frame 30 are both displaceable relative to the base frame 20.

Figure 1:
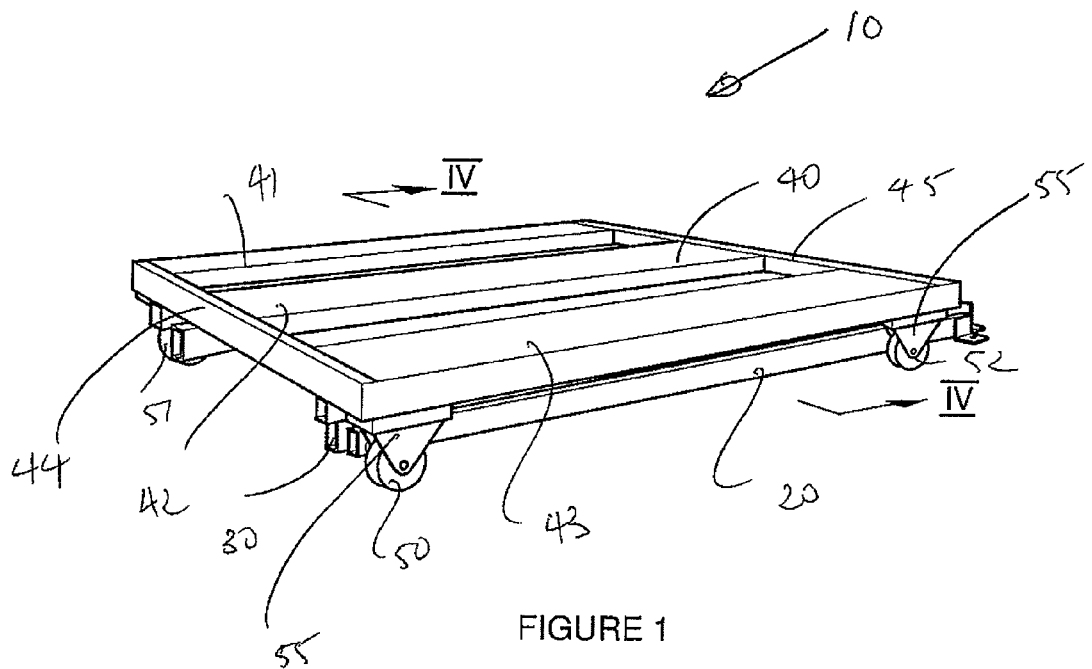
FIG. 1 is a perspective view of a support used to support a pallet.
Figure 2:
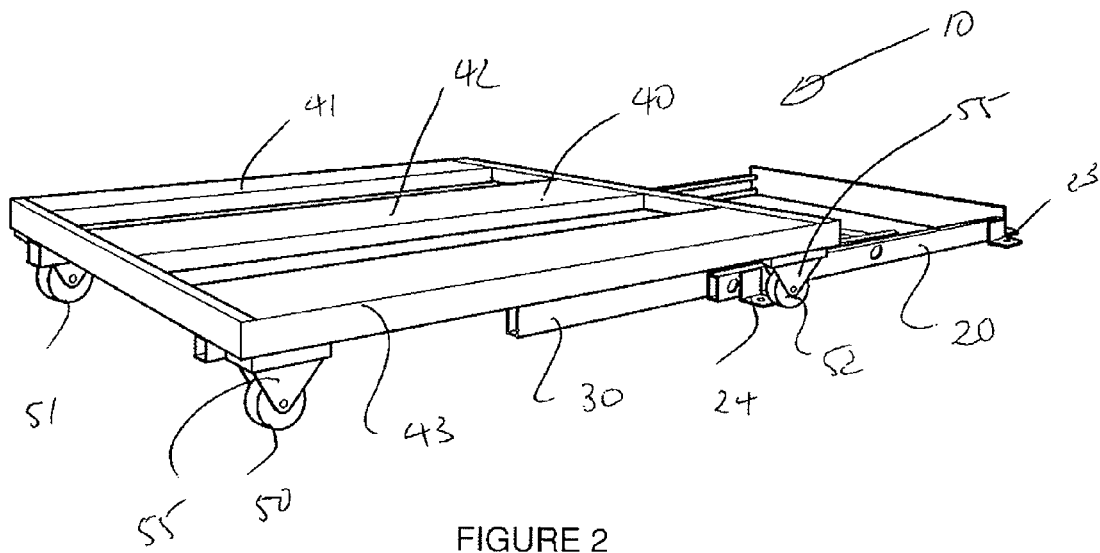
FIG. 2 is a perspective view of the pallet support in the extended position.
Figure 3:
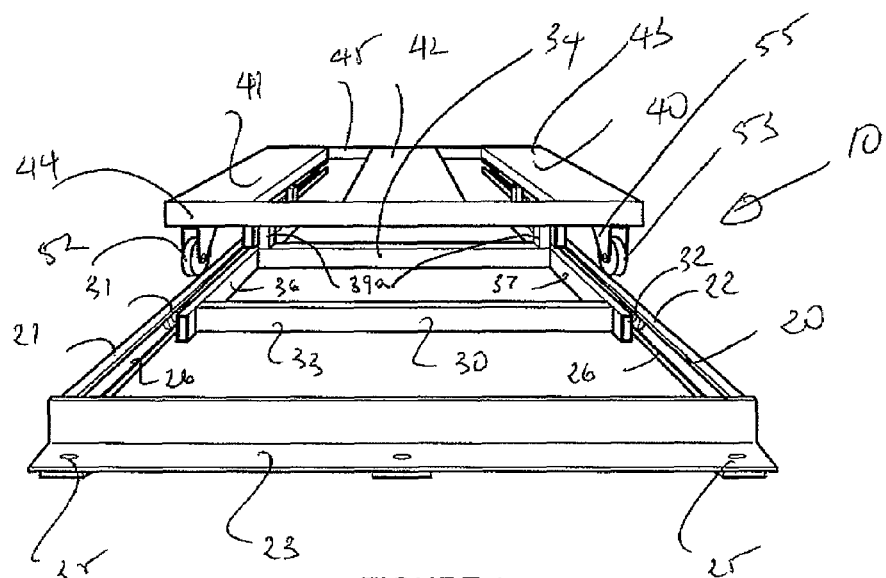
FIG. 3 is an end elevational view of the pallet support in the extended position.
Figure 4:
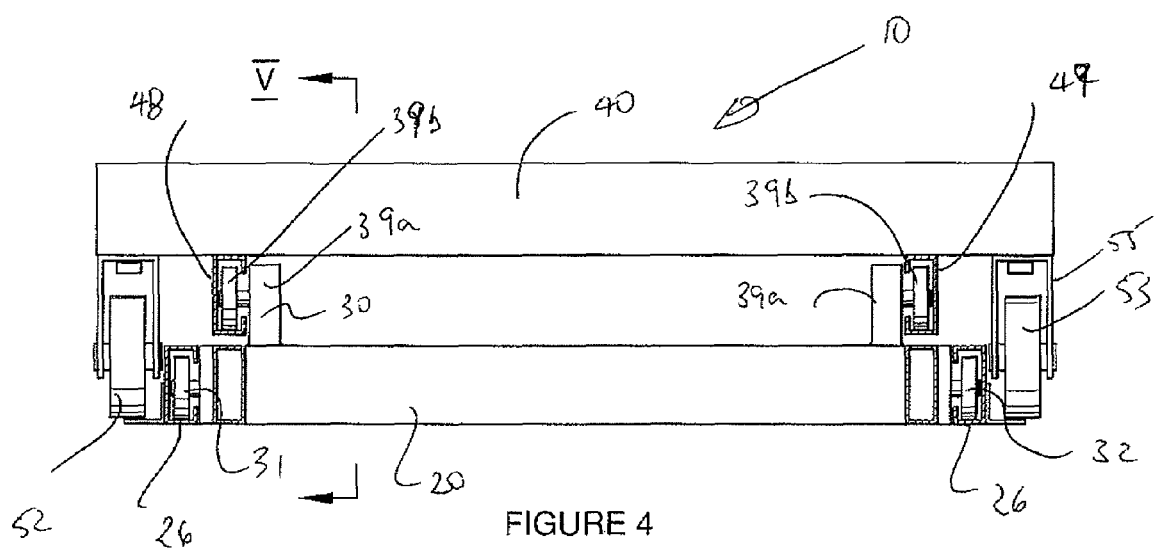
FIG. 4 is a cross sectional view taken along the lines 4-4 of FIG. 1.

The base frame 20 comprises a pair of parallel spaced runners 21, 22, joined by L-shaped cross members 23, 24 at either end. The cross members have bolt holes 25 that allow the base frame 20 to be bolted to the floor. Each runner 21, 22 has a C-shaped longitudinal channel section 26 which acts as an internal rail to accommodate laterally projecting wheels 31, 32 that are positioned at one end and the midspan of a rectangular intermediate frame 30 that sits within the confines of the base frame 20 to be slidable along the rails as shown, with particular reference to FIG. 3.

The intermediate frame 30 has side beams 36, 37 joined by three cross members 33, 34, 35. The wheels 31, 32 are in the same plane as the frame and extend outwardly from the side beams 36, 37. The opposite end of the frame has a pair of upstanding legs 38a that support raised wheels 38b. A similar pair of legs 39a and wheels 39b are positioned at the midspan of the frame. The upper wheels 38b and 39b are arranged to move in C-shaped rails 48, 49 on the underside of the support platform 40.

Thus, the intermediate frame in turn supports the rectangular support platform 40 that comprises three parallel longitudinal bearers 41, 42, 43 joined by transverse beams 44, 45 at either end. The underside of the support surface 40 supports, at each corner, free-wheeling nylon wheels 50, 51, 52, 53 that are supported by a triangular web structure 55 with their rotational axis fixed. The wheels allow the support platform 40 to run on the ground relative to the base frame 20 and intermediate frame 30.

The underside of the support platform 40 at the inside of the bearers 41, 43 supports the C-shaped rails 48, 49 that accommodate the wheels 38b, 39b projecting upward from the intermediate frame 30 so that the support platform 40 can be slid longitudinally relative to the intermediate frame 30.

Figure 5A:
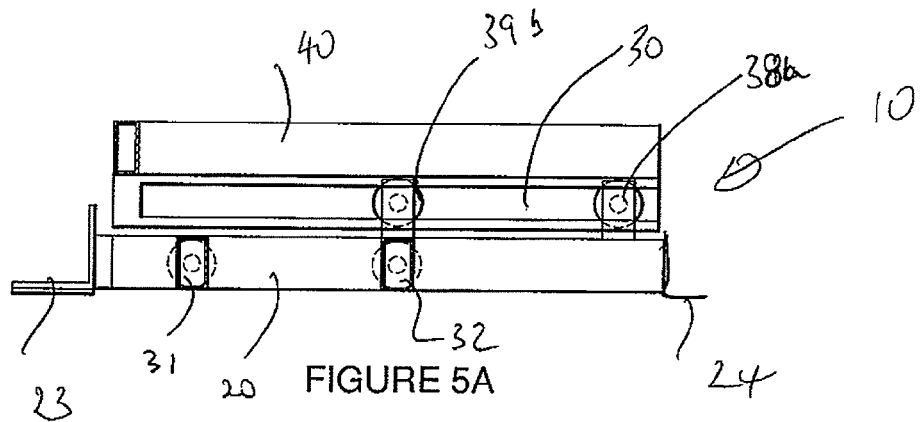
FIG. 5A is a cross sectional view taken along the lines 5-5 of FIG. 4 with the support in an extended position.
Figure 5B:
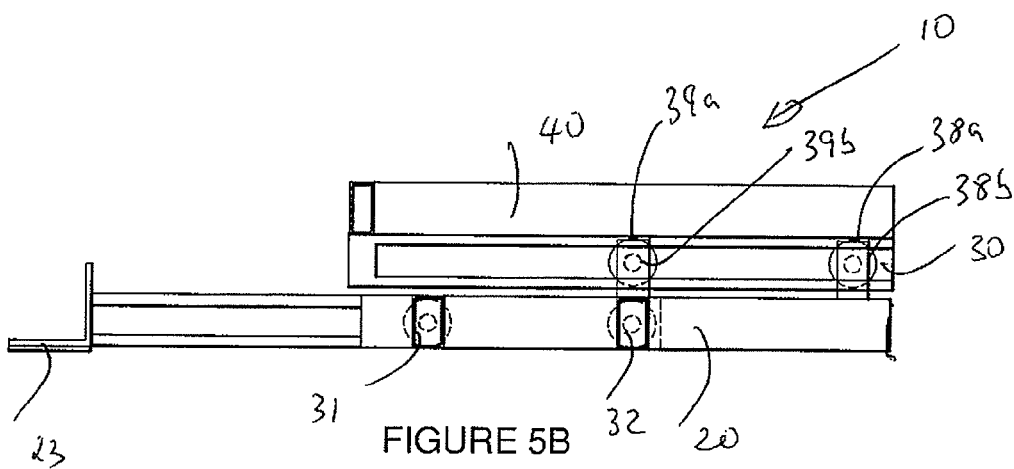
FIG. 5B illustrates the support in a partially extended position.
Figure 5C:
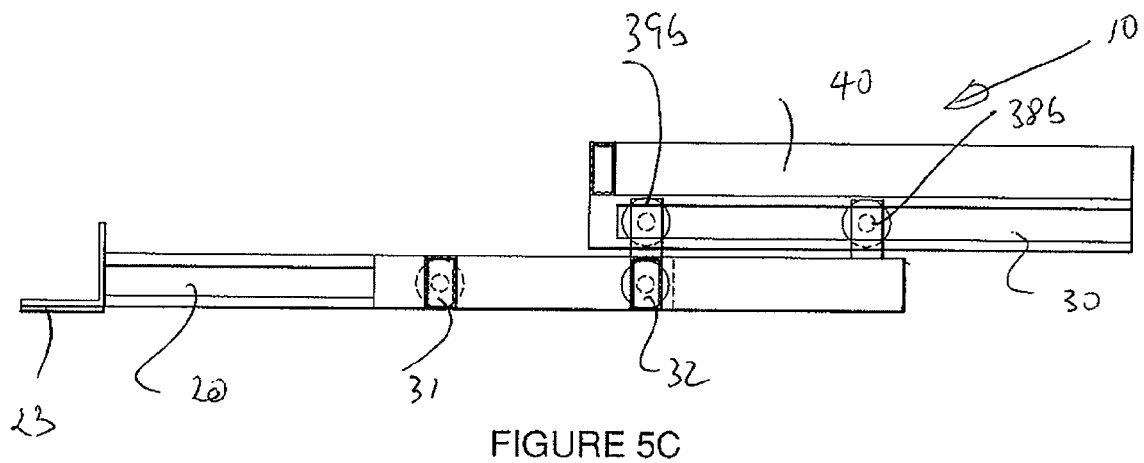
FIG. 5C shows the platform in a fully extended position.

When the support 10 is secured to the floor of a warehouse under shelving, in the unextended position, a pallet can be simply placed on the support platform 40 by use of a forklift or trolley. If access to the pallet is required it is a simple matter to pull the pallet outwardly from the rack that has the effect of causing the support platform 40 to roll longitudinally of the base frame 20 on the wheels 50, 51, 52, 53 at each corner of the platform 40. At the same time the support platform 40 due to its nested engagement with intermediate frame 30, causes the intermediate frame 30 to be longitudinally displaced relative to the base frame so that the whole platform can be pulled clear of the rack thus providing ready access to the contents on the pallet. The displacement can vary but preferably is about 1200 mm. To position the pallet back under the rack, it is a simple exercise to push the support platform 40 inwardly on its wheels 50, 51, 52, 53, causing the support platform 40 to slide relative to the intermediate frame 30 and the intermediate frame 30 to slide up to the end of the base frame 20, thus allowing the platform to assume the unextended position shown in FIG. 5A.

The pallet support 10 may also include a handle which could be telescopic and pivoted to one of either the intermediate frame 30 or platform 40 to facilitate extension of the frames.

It is understood that suitably positioned stops can be incorporated into the base frame 20 and support platform 40 to ensure that when the components are relatively displaced to provide access to the platform 40 the intermediate frame does not disengaged from either the base frame 20 or the support platform 40.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

We claim:

1. A pallet support comprising a support platform secured to a base frame via an intermediate frame, the base frame and support platform have parallel spaced rails which co-operate with two pairs of lower wheels on the intermediate frame which run in the rails of the base frame and a pair of upper wheels on the intermediate frame which run in the rails of the support platform, the intermediate frame being longitudinally slidable relative to the base frame and support platform, and the rails having closed ends or stops which limit the movement of the wheels in the rails, the support platform having ground engaging wheels whereby the support platform can be rolled off the base frame to pull the intermediate frame to one end of the base frame.

2. The pallet support according to claim 1, wherein the ground engaging wheels are positioned adjacent each corner outside the base and intermediate frames.

3. The pallet support according to claim 1, wherein the base frame is adapted to be secured to the ground surface.

4. The pallet support according to claim 1, wherein the support platform has a displacement of about 1200 mm.

* * * * *